(12) United States Patent
Chen et al.

(10) Patent No.: US 6,325,044 B1
(45) Date of Patent: Dec. 4, 2001

(54) APPARATUS AND METHOD FOR SUPPRESSING DIESEL ENGINE EMISSIONS

(75) Inventors: Gong Chen, Erie, PA (US); Bertrand Dahung Hsu, San Jose, CA (US); Robert Douglas Cryer, Erie, PA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/528,929

(22) Filed: Mar. 20, 2000

Related U.S. Application Data

(60) Provisional application No. 60/133,000, filed on May 7, 1999.

(51) Int. Cl.[7] .................................................. F02D 31/00
(52) U.S. Cl. ......................... 123/357; 123/500; 123/501
(58) Field of Search ..................................... 123/500, 501, 123/502, 357

(56) References Cited

U.S. PATENT DOCUMENTS

| | | | |
|---|---|---|---|
| 4,346,688 | * 8/1982 | Kaibara et al. ...................... | 123/502 |
| 5,394,851 | * 3/1995 | Cryer ................................... | 123/506 |
| 5,623,909 | * 4/1997 | Wertheimer .......................... | 123/501 |
| 5,647,317 | 7/1997 | Weisman, II et al. . | |
| 5,680,842 | * 10/1997 | Schmid ................................ | 123/357 |
| 5,847,644 | 12/1998 | Weisman, II et al. . | |
| 6,021,756 | * 2/2000 | Nakamura ............................ | 123/385 |
| 6,158,416 | * 12/2000 | Chen et al. .......................... | 123/380 |

* cited by examiner

Primary Examiner—Thomas N. Moulis
(74) Attorney, Agent, or Firm—Carl A. Rowold; David A. Fox; Cantor Colburn, LLP

(57) ABSTRACT

An exemplary embodiment of the invention is a method of controlling fuel injection timing in a compression ignition engine including at least one cylinder. The method includes monitoring engine throttle position and change. One of an acceleration and a load ascending transient operating mode is detected in response to the monitoring of throttle position and change. Fuel injection timing for the at least one cylinder is controlled in accordance with a predetermined timing schedule in response to the detection of one of an acceleration and a load ascending transient operating mode. A system for implementing the method is also disclosed.

30 Claims, 4 Drawing Sheets

APPARATUS AND METHOD FOR SUPPRESSING DIESEL ENGINE EMISSIONS

CROSS REFERENCE TO RELATED APPLICATION

This application claims the benefit of U.S. provisional patent application Ser. No. 60/133,000 filed May 7, 1999, the entire contents of which are incorporated herein by reference.

BACKGROUND OF THE INVENTION

The invention relates generally to electronic fuel control systems for compression ignition engines and, more particularly, to a fuel injection control system that suppresses emission generation of compression ignition diesel engines.

Diesel engines are well known for producing black smoke or heavy particulate emissions during acceleration or load ascending transients. One cause of this phenomenon is the late burning associated with the combustion of fuel injected in compression cylinders during these acceleration and load ascending transient engine operating modes.

The basic combustion process for diesel engines involves a diffusion type combustion of liquid fuel. As liquid fuel is injected into compressed hot cylinder air, it evaporates and mixes with the surrounding air to form a flammable mixture. This is a continuing process that happens over time as the fuel is injected into the cylinder. The mixture formed initially will combust and raise the local temperature before the later evaporated fuel has time to fully mix with air. As a result, the later burned fuel is subjected to high temperatures with insufficient air. Under such conditions, high temperature pyrolysis of fuel will take place and thus form soot. As the combustion proceeds in the cylinder, a substantial portion of this soot will be burned-up as a result of later exposure to available air in the cylinder. The soot will continue to be burned up in the engine until the power stroke volume expansion sufficiently lowers the cylinder temperature, thereby ceasing the chemical reaction. Any non-combusted soot remaining in the cylinder at this point exits the engine as smoke or particulate emission when the exhaust valve is opened.

In compression combustion engines, therefore, two opposing mechanisms for soot occurrence exist: soot formation and soot burn-up. In typical combustion engines under typical operating conditions the soot burn-up mechanism is sufficient to reduce emissions caused by soot formation. However, in certain engines operating under accelerating or load ascending transient conditions, the soot burn-up mechanism is insufficient for reducing the generation of soot emissions, as is discussed more fully herein below. Late burning of injected fuel results in engines operating under acceleration or load ascending transient conditions. As such, adequate time is not provided for the occurrence of the soot burn-up process prior to opening of the exhaust valve. Thus, the significant expulsion of smoke and particulate emission is common in a large diesel engine operating under accelerating or load ascending transient conditions.

Compression ignition engines of the prior art typically have fixed injection timing via a governor and mechanical linkages which actuate a series of fuel delivery devices simultaneously. Fuel injection start timing is generally predetermined for any given engine operating point and typically cannot be modified for varying conditions. Fuel delivery systems may include pump-line-nozzle configurations or unit injection configurations. An electronic fuel injection system for large cylinder volume displacement diesel engines is disclosed in U.S. Pat. No. 5,394,851. This prior art fuel injection system is employed in conjunction with a typical compression ignition diesel engine shown generally at 10 in FIG. 1. The engine 10 may be any large diesel engine. Such an engine may include a turbo charger 12 and a series of unitized power assemblies 14. For example, a twelve-cylinder engine has twelve such power assemblies while a sixteen-cylinder engine has sixteen such power assemblies. The engine 10 further includes an air intake manifold 16, a fuel supply line 18 for supplying fuel to each of the power assemblies 14, a water inlet manifold 20 used in cooling the engine, a lube oil pump 22 and a water pump 24, all as known in the art. An intercooler 26 connected to the turbo charger 12 facilitates cooling of the turbo charged air before it enters a respective combustion chamber inside one of the power assemblies 14. The engine may be a Vee-style type, also as known in the art.

Although well suited for its application, the system of FIG. 1 neither distinguishes nor does it accommodate for accelerating and load ascending transient operating modes and the effect of these operating modes upon the generation of emissions due to late combustion as discussed herein. In such systems, the fuel injection timing of a diesel engine is usually prescribed for each operating condition (speed and load) at its optimum for steady state operation. When the engine is experiencing load ascending transients or acceleration, the injection timing will still be set at its instantaneous value called for by the steady state condition. Operating under a steady state condition, there is usually enough time in the combustion cylinder to control particulate or smoke emissions via the soot burn-up process described herein above. During load ascending or acceleration transients, however, the engine calls for more fuel thus the fuel injection duration becomes longer. The combustion of the added fuel, which enters the cylinder at the end of the injection duration, does not have enough time for soot burn-up before the exhaust valve opens. The result is the increased emission of heavy smoke or particulate matter during the exhaust stage of the engine cycle. This is particularly true for the modern-day low emission diesel engine, which applies retarded fuel injection timing during steady state operation in the attempt to reduce NOx emissions.

Normal acceleration of a diesel engine (such as a medium speed engine for locomotive applications) produces transient conditions which vary from steady state conditions and increase the production of soot and particulate emissions. Such engines also encounter radical load changes due to the switching of large auxiliary loads such as compressor loads or fan loads in locomotive applications and "hotel" power loads (an alternator for generating 110 V at 60 hz) for passenger train applications. Driving such loads or turning off such loads can result in load transients on the order of 500 horsepower at any instant. Late burning of injected fuel, as discussed herein above, is prevalent in such acceleration and load ascending transient diesel engine operating modes. The late burning prevents proper combustion of generated soot and results in increased engine expulsion of smoke and particulate emissions.

Therefore, it is desirable to suppress the smoke expulsion and particulate emission during acceleration and load ascending transient operating modes of a compression ignition engine and also maintain proper operation during steady state modes.

SUMMARY OF THE INVENTION

An exemplary embodiment of the invention is a method of controlling fuel injection timing in a compression ignition engine including at least one cylinder. The method includes monitoring engine throttle position and change. One of an acceleration and a load ascending transient operating mode is detected in response to the monitoring of throttle position and change. Fuel injection timing for the at least one cylinder is controlled in accordance with a predetermined timing schedule in response to the detection of one of an acceleration and a load ascending transient operating mode. A system for implementing the method is also disclosed.

DETAILED DESCRIPTION OF THE PREFERRED EMBODIMENTS

Figure 2:
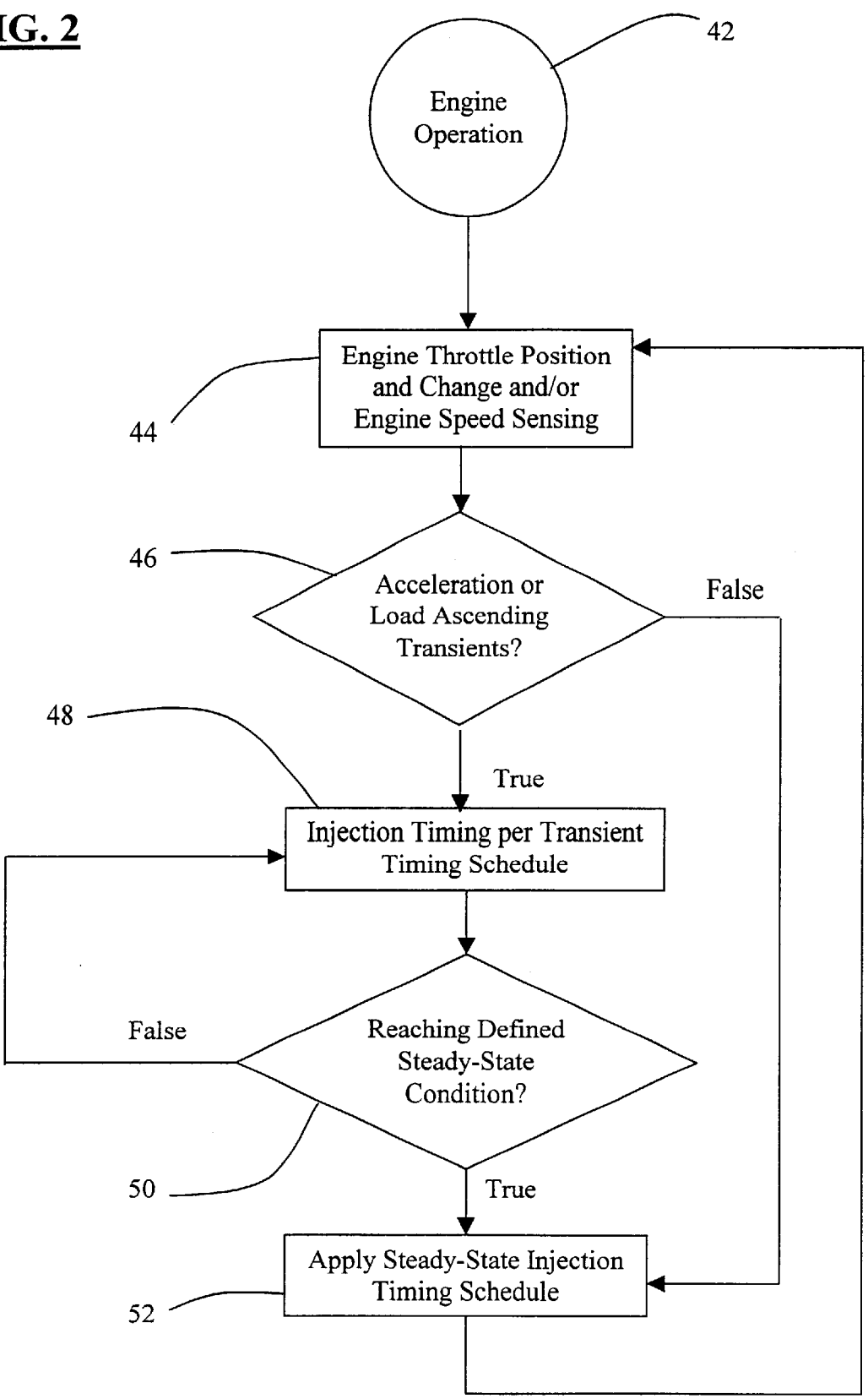
FIG. 2 is a flowchart of a method of suppressing diesel engine emissions in an embodiment of the invention.

FIG. 2 is a flowchart of an exemplary method of suppressing diesel engine emissions during acceleration or load ascending transients by use of an electronic fuel injection timing system discussed further herein below. The diesel engine may be a medium speed, large displacement volume engine such as that used in locomotive or marine applications. As previously described, diesel engines often experience frequent acceleration and/or load ascending transient conditions. Demands for a change in engine speed and/or load conditions of such engines are requested directly by an engine operator via a throttle select input as defined by a desired engine RPM and horsepower level. Demand for an increase in engine speed and/or load may be initiated by an operator or automatically by a series of engine sensors and actuators. For example, when an operator wishes to increase engine speed and/or power, an appropriate signal, indicative of a demanded increase in speed and/or power, will command the fuel injection system and a loading device that is driven by the engine to reach the engine speed and/or power by injecting a greater amount of fuel into the cylinders. As is discussed herein above, during acceleration or load ascending transients, the engine requires more fuel per injection and the fuel injection duration accordingly becomes longer. Thus, at fixed injection start timing late burning occurs and increased heavy smoke or particulate emission results.

Figure 1:
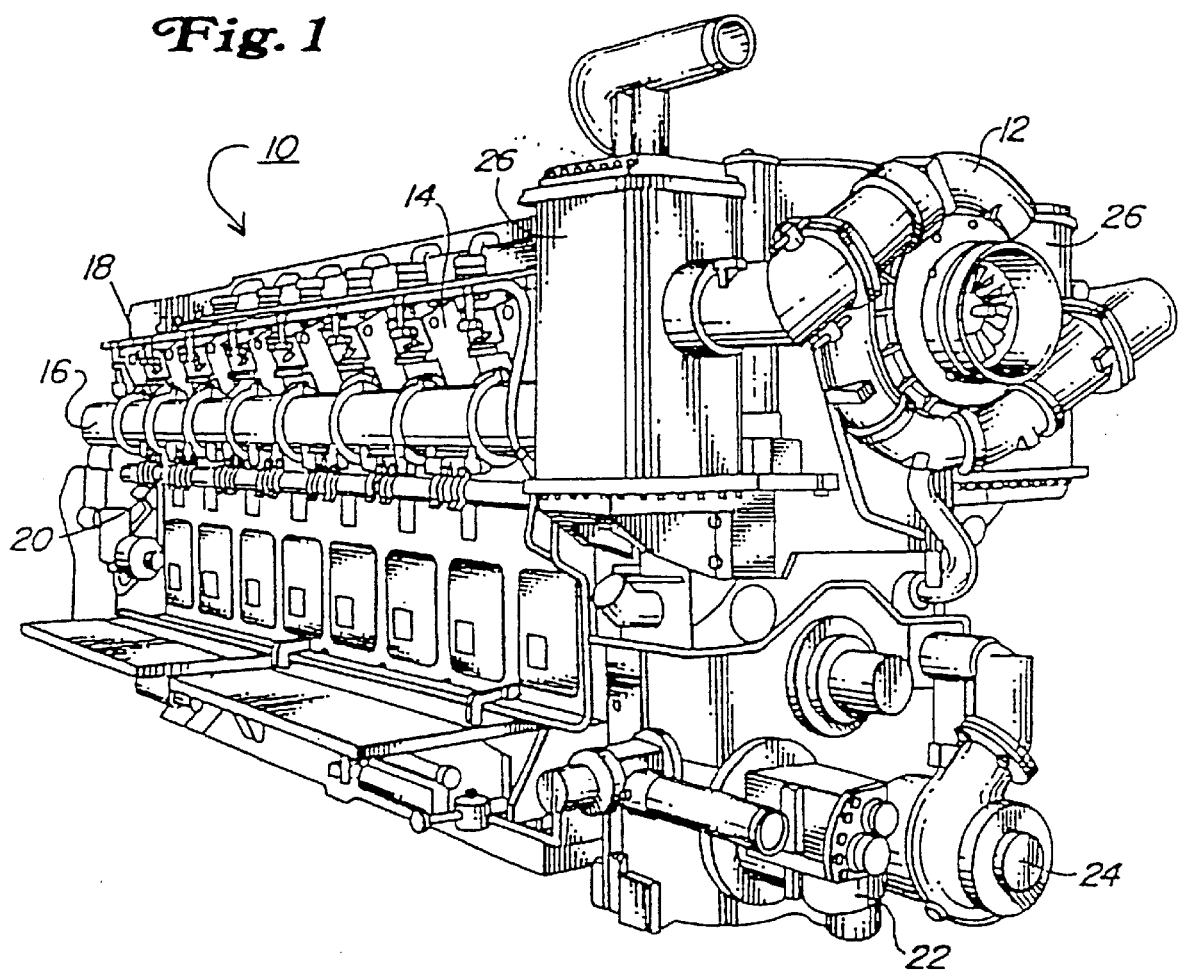
FIG. 1 is a perspective view of a common Vee-style diesel locomotive engine.

Referring now to FIG. 2, the method of reducing diesel engine emissions during acceleration and/or load ascending transients begins with engine operation as shown at 42. The engine operation 42 may be that of a diesel engine with a large cylinder displacement volume such as the engine 10 depicted in FIG. 1 commonly used in locomotive applications. During engine operation 42, the operator may demand an engine speed and/or load change by altering the position of a throttle or notch selector. Alternatively, a demand for engine load change may result from auxiliary sources such as a compressor.

An engine throttle position and change sensing or engine speed sensing step 44 detects the throttle position change and/or engine speed of the diesel engine. An acceleration or load ascending transient operating mode is detected based on two techniques. In a first technique, the position and change of the throttle is monitored. If the throttle is moved by the operator, the position and amount of movement is detected and an acceleration or load ascending transient is detected based on throttle movement. In a second technique, the actual engine speed is compared to desired engine speed to determine if an auxiliary device has demanded increased speed and/or load on the engine. In the second technique, no movement of the throttle is necessary to create an acceleration or load ascending transient.

Upon detecting throttle change and/or engine speed, an operating mode determination is made at step 46. In the first method, the operating mode determination step 46 distinguishes an acceleration or load ascending transient operating mode from a deceleration or load descending transient operating mode by sensing the direction of the throttle movement. Under the second method, an acceleration or load ascending transient is detected by comparing the actual engine speed to the demanded engine speed and further determining any variation there between. An acceleration or load ascending transient condition is defined by a demand for an increase in speed and/or load which exceeds a prescribed threshold for a particular steady state operating condition.

If an acceleration or load ascending transient mode is detected, flow proceeds to step 48 where a transient injection timing schedule is accessed to control fuel injection timing. If neither an acceleration nor a load ascending transient is detected at 46, then the method applies a steady-state injection timing schedule at step 52 as is discussed further herein below. At step 48, the transient injection timing schedule is used to advance the fuel injection timing during an acceleration or load ascending transient by following the transient fuel injection timing schedule relative to the steady state condition in accordance with the sensed transient condition to achieve a desired reduction of smoke and particulate emission. At different acceleration or load ascending modes, the fuel injection timing or timing change may be different. The degree of change in the fuel injection timing may be dependent upon the intensity of the acceleration or load ascending transient. For example, moving the throttle from notch 1 to notch 2 may require less timing advance than moving the throttle from notch 1 directly to notch 8. The predetermined timing schedule may include values dependent on the intensity of the transient mode.

At step 50, it is determined whether a steady state condition has been reached. If a steady-state engine operation is detected at step 50, a steady-state injection timing schedule is used at step 52 thereby optimizing the engine steady state operation and performance. If a steady-state condition is not reached at step 50, the system proceeds to step 48 where the system continues to utilize the transient injection timing schedule to administer the prescribed fuel injection sequence to maintain the desired reduction of smoke and particulate emissions. Upon applying the steady-state injection timing schedule at 52, the method returns to step 44 to continuously monitor throttle position change and/or engine speed change. Throttle change indicates a request for a change in speed and/or load. Engine speed change indicates an auxiliary load switching on or off creating a change from the desired engine speed.

Figure 3:
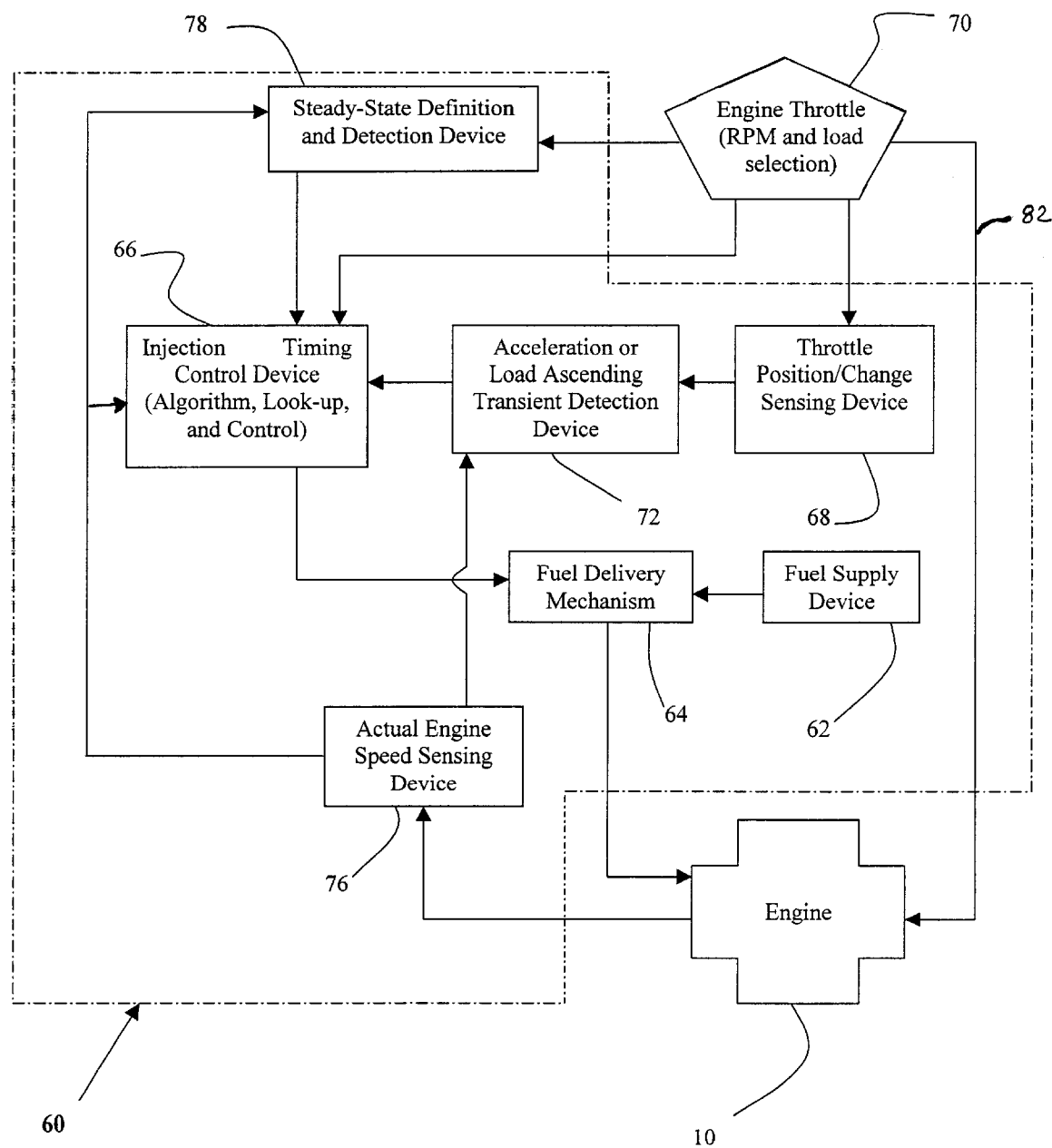
FIG. 3 is a schematic block diagram of a fuel injection timing control system in an embodiment of the invention.

FIG. 3 is a schematic block diagram of an exemplary system for suppressing diesel engine emissions 60, in accordance with the present invention. The system 60 may be used to implement the method for suppressing diesel engine emissions shown in FIG. 2. The system 60 is coupled with an engine 10 which may be a compression ignition engine such as the engine 10 of FIG. 1. The system 60 generally includes a fuel supply device 62, a fuel delivery mechanism 64, a fuel injection timing control device 66, and a plurality of sensing devices discussed further herein. The system 60 may be incorporated in a fuel injection system or be implemented in conjunction with an existing fuel injection system of the engine 10.

The system 60 operates relative to an engine throttle 70 disposed in communication with the engine 10. The engine throttle 70 is utilized by an operator to indicate a demand for a change in speed and/or load of the engine 10. By moving the engine throttle the operator may indicate a desire for a change in speed from one steady state operating condition to another. Similarly, the operator may indicate a desire for a change in engine load from one steady state operating load condition to another by manually repositioning the throttle. Engine speed and/or load may also be selected using an automatic device which may execute a preset program for controlling the engine. A throttle selection signal 82 is supplied to a loading device such as an alternator mechanically coupled to the engine to generate a desired engine power corresponding to the selected throttle position.

The engine throttle position and change sensing device 68 senses the position and change of the engine throttle 70 indicating a selection of a speed and/or load from one steady state to another. The actual speed sensing device 76 detects an actual engine operating speed (engine RPM) relative to the positioning of the engine throttle 70. The actual engine RPM is determined by the actual speed sensing device 76 using a timing signal generator (not shown) coupled to the engine crankshaft or cam shaft.

The acceleration or load ascending transient detection device 72 uses input from the engine throttle position and movement sensing device 68 to detect an acceleration or load ascending transient operating mode. The transient detection device 72 may also use input from the actual engine speed sensing device 76 to determine if the engine experiences an acceleration or load ascending transient operating mode. For example, if the demanded engine RPM is higher than the actual engine RPM by a prescribed threshold then an acceleration or load ascending transient operating mode exists. This may occur if an auxiliary device (e.g., a compressor) turns on without a change in engine throttle position. Continuing the current example, the acceleration or load ascending transient detection device 72 would then send the appropriate signal to the fuel injection timing control device 66 to advance injection timing to accommodate the acceleration transient operating condition. The degree of injection timing change may depend on the intensity of the acceleration or load ascending transient and may be different for different transient modes.

The control device 66 may include a memory device (not shown) which stores a series of look-up tables containing desired injection timing data. The control device 66 may be implemented using a microprocessor, programmed logic array (PLA) or other known devices. The injection timing data in the look-up table(s) may correspond to engine operation modes such as steady state or transient modes and operation parameters such as the engine speed and the amount of fuel per injection. The control device may include different injection timing data for different transient and steady state modes defined by the position of the throttle 70. The control device 66 may also include a preprogrammed algorithm which uses the look-up timing tables to determine optimum timing profiles for particular engine steady-state and transient speed-load conditions.

Referring again to FIG. 3, a steady-state definition and detection device 78 detects if a steady state condition following a transient mode is reached. A steady state condition may be determined by comparing an actual engine speed and/or load to a desired engine speed and/or load and determining that the difference is below a predefined limit. Alternatively, a steady state condition may be determined by sensing the end of a predetermined time elapse following detection of acceleration or a load ascending transient. In this embodiment, the steady-state definition and detection device 78 includes a timer for measuring the elapsed time. The predetermined time may vary depending on the intensity of the acceleration or load ascending transient. For example, more time may be needed to reach a steady state after a high degree of acceleration. Another technique for detecting a steady state condition is to monitor the rate of change of fuel delivery and detect a steady state condition when the rate of change is below a limit. Upon sensing a steady-state operating condition the control device 66 may draw upon look-up tables containing steady-state injection timing data and implement the appropriate fuel injection to attain the desired engine steady state operation and performance.

Figure 4:
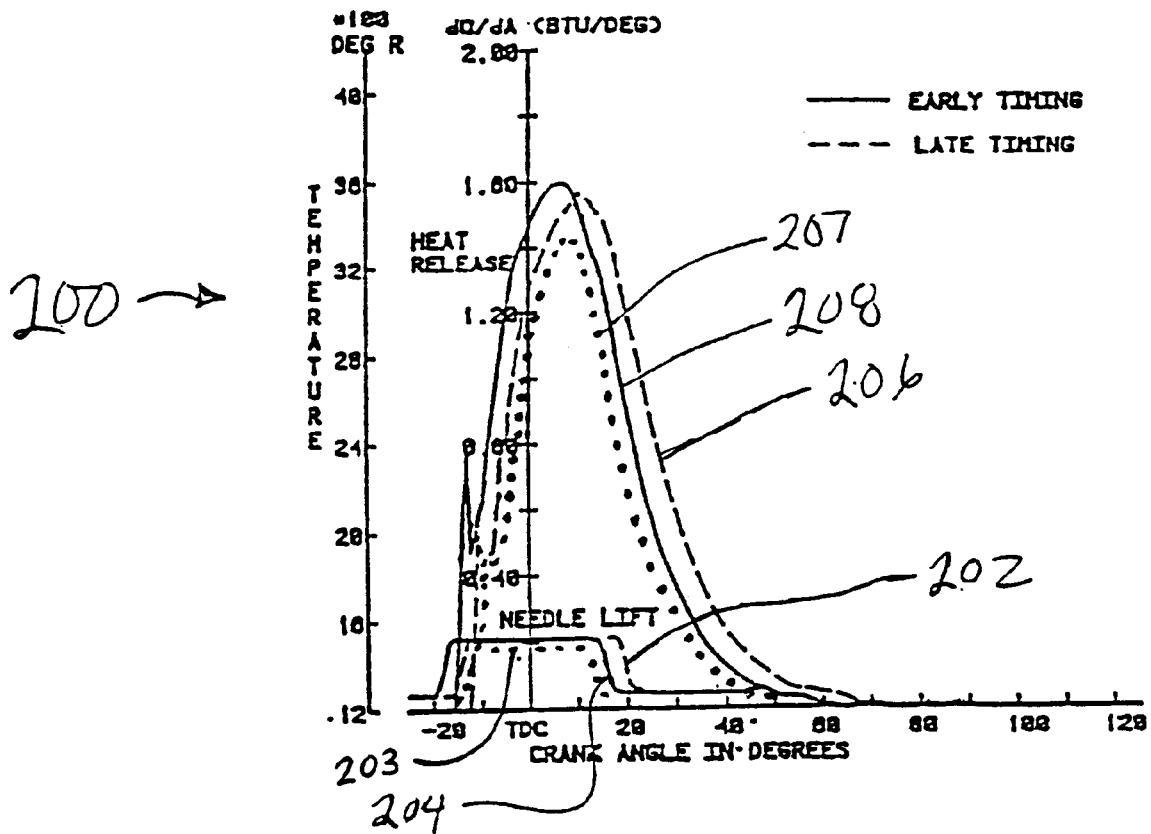
FIG. 4 is a graphical representation of the relationship between injection timing and combustion in an embodiment of the invention.

Referring to FIG. 4, an embodiment of the present invention is depicted graphically at 200 showing the relationship between fuel injection timing and combustion. The actuation of an individual injector is shown in terms of crank angle relative to top dead center (TDC) of a respective piston. This actuation of the injector is represented by line 203 for a steady state condition and is represented by line 204 for an acceleration or load ascending transient mode. Similarly the heat release within the cylinder is shown in terms of crank angle relative to TDC and is represented by line 207 for a steady state condition and is represented by line 208 for an acceleration or load ascending transient mode. Lines 204 and 208 represent the early timing provided by the present invention to produce an earlier heat release, relative to TDC, and to preclude late burning, and thus soot and particulate emissions.

In operation, the control device 66 receives input from various sensors as described herein above. When the control device 66 determines that steady state conditions exist, then the control device 66 instructs the fuel delivery mechanism 64 to follow line 203 and produce a heat release that follows line 207. When the control device 66 determines that an acceleration or load ascending transient mode exists, the control device 66 adjusts the fuel injection timing so as to follow line 204, for example, to produce a heat release that follows line 208. Without the timing advance, the fuel injection firing would be represented by line 202 and the corresponding heat release is shown as line 206. By shifting the timing in accordance with the present invention late burning, soot production and particulate emissions are alleviated. The lo control device 66 continuously monitors sensor input to determine the existence and/or magnitude of any acceleration or load ascending transient modes relative to a steady state condition and corrects the fuel injection timing in accordance with the operating mode detected and sensed. When a steady state condition is reached and sensed the control device 66 returns the timing of the fuel injection to the steady state condition as represented by lines 203 and 207.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the appended claims.

What is claimed is:

1. A method of controlling fuel injection timing in a compression ignition engine including at least one cylinder, the method comprising:
monitoring engine throttle position and change;
detecting one of an acceleration and a load ascending transient operating mode in response to said monitoring throttle position and change; and
controlling fuel injection timing for the at least one cylinder in accordance with a predetermined timing schedule in response to the detecting of one of an acceleration and an load ascending transient operating mode.

2. The method of claim 1 further comprising:
sensing actual engine speed;
comparing a desired engine speed to said actual engine speed; and
detecting one of an acceleration and a load ascending transient operating mode in response to said comparing.

3. The method of claim 1 wherein said detecting comprises distinguishing between an acceleration, a load ascending transient operating mode, a deceleration and a load descending transient operating mode.

4. The method of claim 1 wherein said detecting further comprises detecting a steady state operating mode.

5. The method of claim 4 wherein said detecting said steady state operating mode includes detecting when a difference between said desired engine speed and said actual engine speed is below a limit.

6. The method of claim 4 wherein said detecting said steady state operating mode includes detecting a steady state operating mode at a predetermined time after detecting a position change of the engine throttle.

7. The method of claim 6 wherein said predetermined time is dependent upon an intensity of said one of said acceleration and load ascending transient.

8. The method of claim 4 wherein said detecting said steady state operating mode includes detecting when a rate of change of an amount of fuel injection is below a limit.

9. The method of claim 1 wherein said predetermined timing schedule is a steady state mode injection timing schedule.

10. The method of claim 1 wherein said predetermined timing schedule is a transient mode injection timing schedule.

11. The method of claim 1 wherein said predetermined timing schedule includes values dependent on an intensity of the transient mode.

12. The method of claim 1 wherein said predetermined timing schedule includes a plurality of timing schedules.

13. An electronic fuel injection system for a compression ignition engine, the system comprising:
an engine throttle position and change sensing device for detecting the position and change of an engine throttle;
an acceleration and load ascending transient detection device which detects one of an acceleration and a load ascending transient in response to said engine throttle position and change sensing device;
a control device for controlling fuel injection timing for the at least one cylinder in accordance with a predetermined timing schedule in response to the detecting of one of an acceleration and an load ascending transient operating mode.

14. The system of claim 13 further comprising:
an actual engine speed sensing device for sensing an actual engine speed;
wherein said acceleration and load ascending transient detection device detects one of an acceleration and a load ascending transient in response to comparison of said actual engine speed and said desired engine speed.

15. The system of claim 13 wherein said acceleration and load ascending transient detection device distinguishes between an acceleration, a load ascending transient operating mode, a deceleration and a load descending transient operating mode.

16. The system of claim 13 further comprising a steady state detecting device for detecting a steady state operating mode.

17. The system of claim 16 wherein said steady state detecting device detects a steady state operating mode when a difference between said desired engine speed and said actual engine speed is below a limit.

18. The system of claim 16 wherein said detecting said steady state detecting device detects a steady state operating mode at a predetermined time after detecting a position change of the engine throttle.

19. The system of claim 18 wherein said predetermined time is dependent upon an intensity of said one of said acceleration and load ascending transient.

20. The system of claim 16 wherein said steady state detecting device detects a steady state operating mode when a rate of change of amount of fuel injection is below a limit.

21. The system of claim 13 wherein said predetermined timing schedule is a steady state mode injection timing schedule.

22. The system of claim 13 wherein said predetermined timing schedule is a transient mode injection timing schedule.

23. The system of claim 13 wherein said predetermined timing schedule includes values dependent on an intensity of the transient mode.

24. The system of claim 13 wherein said predetermined timing schedule includes a plurality of timing schedules.

25. A method of controlling the fuel-injection timing in a compression-ignition engine wherein an operator is not subject to a substantially fixed percentage of the torque output of the engine, the method comprising:
monitoring an input indicative of an operator-desired engine speed;
differentiating the input with respect to time;
sensing an actual engine speed;
calculating a difference between the monitored desired engine speed and the sensed actual engine speed;
comparing the differentiated input with the calculated difference;
detecting at least one of an acceleration and a transient load in response to said comparing; and
controlling at least one of an injection start time and an injection duration in response to said detecting.

26. A method as defined in claim 25 wherein the compression-ignition engine is large.

27. A method as defined in claim 26 wherein the large compression-ignition engine is disposed in a locomotive.

28. A method as defined in claim 27 wherein the operator of the locomotive is disposed remote from the locomotive.

29. A method as defined in claim 27 wherein the locomotive is flexibly interconnected with at least one other car having a separate inertial mass.

30. A method as defined in claim 27 wherein the locomotive is one of a plurality of flexibly interconnected locomotives.

* * * * *